Patented May 8, 1951

2,552,486

UNITED STATES PATENT OFFICE 2,552,486

4-AMINOSALICYLIC ACID COMPOSITION AND METHOD OF PREPARING THE SAME

Martin E. Hultquist, Bound Brook, N. J., assignor to American Cyanamid Company, New York, N. Y., a corporation of Maine No Drawing. Application September 27, 1949, Serial No. 118,183

10 Claims. (Cl. 260—519)

This invention relates to a process of preparing light-stable 4-aminosalicylic acid and to the new stabilized product.

4-aminosalicylic acid has been used to a considerable extent in the treatment of tuberculosis in human beings. Its activity is not extremely high and the doses which are used are therefore relatively very large. Commercial 4-aminosalicylic acid is a light tan, or even brown in color, and even when obtained as a white product it darkens rapidly on exposure to light. In the large doses in which the compound is used for the treatment of tuberculosis, toxic effects have sometimes been noted, and it has been suggested that some of these effects may be due to decomposition products. It is, therefore, desirable to have the drug available in a white, stable form, and this has not been achieved in the past.

According to the present invention it has been found that if the 4-aminosalicylic acid, either after or during final purification and decolorization, is treated with small amounts of ascorbic acid so that a very small amount remains in the product, a white 4-aminosalicylic acid is obtained which shows a greatly enhanced stability and can be kept for a considerable period of time when suitable precautions are taken, such as storage in brown glass bottles.

The amount of ascorbic acid required is very small. Its stabilizing effect increases rapidly up to about 0.1%, at which point maximum stability is closely approached. Larger quantities of ascorbic acid do not increase the stability sufficiently to warrant their additional cost. Smaller amounts of ascorbic acid will give substantial improvement in stability, and improvement to a practical degree is noted with as little as 0.03%.

The mechanism by which the ascorbic acid acts has not been clearly determined. At first glance it might be thought that the action is as an anti-oxidant, as it is well-known that ascorbic acid has strong anti-oxidant properties. However, this does not appear to be the explanation because other well-known anti-oxidants for various substances including foodstuffs do not impart the extraordinary increase in stability which is noted with ascorbic acid. As an example the following typical anti-oxidants have been tried but fail to impart the stability which is obtained with ascorbic acid: Sodium polyphosphate, citric acid, glycine, glutamic acid, tartaric acid, gluconic acid, sodium sulfite, hydrazine, thioglycollic acid, thiourea, glucose, sucrose, methylglucamine, formaldehyde, lecithin, monobenzylether of hydroquinone, 2,6-di-tertiary butyl-para-cresol. It is not intended to limit the present invention to any particular theory of how the ascorbic acid works. It seems reasonably clear that it is not acting purely as an anti-oxidant; however, it is possible that it performs a number of functions including anti-oxidant action. The above discussion is therefore made without intending to limit the invention to any particular theory of operation.

It is possible to introduce the ascorbic acid into the 4-amino-salicylic acid in various ways. For instance, a slurry of partially purified 4-aminosalicylic acid in water, or an organic solvent such as methanol, ethanol, isopropanol, or toluene, may be treated with ascorbic acid and the 4-aminosalicylic acid filtered and dried. Another method is to wash the purified 4-aminosalicylic acid in the form of a filter or centrifuge cake with a solution of ascorbic acid in water or an organic solvent. The above methods may advantageously be combined with the final precipitation and washing in the ordinary manufacture of 4-aminosalicylic acid. It is, of course, possible to combine both methods.

In its broader aspects, the invention relates to an improved, stable 4-aminosalicylic acid product, and it is not intended to limit the product to any particular method by which the ascorbic acid is introduced. In a more specific aspect of the invention, however, the preferred methods of introducing the ascorbic acid are included.

The invention will be described in greater detail in conjunction with the following specific examples which are typical illustrations. Parts are by weight.

*Example 1*

A sample of partially purified 4-aminosalicylic acid as a wet cake containing about 160 parts of dry 4-aminosalicylic acid is slurried in 1200 parts of distilled water. To this is added concentrated aqueous ammonia until the pH of the solution is 6.5 to 7.5, 15 parts of activated charcoal is added, and after stirring occasionally for 15 minutes, the solution is clarified.

To the clear filtrate is added about 0.1 to 0.2 part of sodium dithionite (sodium hydrosulfite) and the product is precipitated by addition of 5 N hydrochloric acid to pH 2.5-3.5, maintaining the temperature at 25-35°. The slurry is cooled to 10°, filtered, and washed chloride-free with distilled water. The wet cake, 347 parts, is divided into portions, and each portion is washed thoroughly on the filter with solutions of ascorbic acid as listed: 0.0%, 0.008%, 0.015%, 0.03%, 0.05%, 0.10%. These samples, containing about 50% dry solid, on drying overnight at 45° C., have ascorbic acid contents approximating the figures given.

On exposure to air and indirect sunlight for from 24 to 48 hours, the product containing no ascorbic acid shows maximum darkening. The darkening decreases rapidly as the ascorbic acid content is increased, a very material lightening being observed with ascorbic acid contents approximating 0.03%. The product with 0.1% ascorbic acid shows practically no darkening at all.

*Example 2*

The starting 4-aminosalicylic acid in each case is a sample which has been freed of iron and which contains no material insoluble in aqueous sodium bicarbonate solution. It is white with a faint yellowish cast, as freshly prepared.

12 parts are dissolved in 165 parts of 85% ethanol at 45–50° C., treated with 1.2 parts of activated carbon, and 0.6 part of a filter aid. It is clarified at 45–50° C. and the almost water-white solution is divided into two equal parts.

A. One-half is diluted with 200 parts of water while stirring. A precipitate forms rapidly. The mixture is cooled to 0° C. and filtered, the precipitate is washed with 25 parts of 20% aqueous ethanol and then dried 16 hours in an air-circulating oven at 40–45° C.

B. The other half of the solution is treated with 0.29 part of ascorbic acid, and then it is diluted with water, and the precipitate is filtered as above. The cake on the filter is washed with 25 parts of 20% aqueous ethanol containing 0.05 part of ascorbic acid and dried at 40–45° C. as above in A.

The product treated by process A darkens markedly in indirect sunlight and is distinctly not white. The product by process B is much lighter and shows high stability to darkening.

*Example 3*

12 parts of 4-aminosalicylic acid of the same lot used in Example 2, is dissolved in 60 parts of 80% acetone, treated with 1.2 parts of activated carbon, and 0.6 part of a filter aid, and clarified at 40–45° C. The filtrate was divided into two equal parts, A and B.

A. One-half is diluted with 90 parts of water, cooled to 0° C. and filtered. The precipitate is washed with 25 parts of 20% aqueous acetone and then dried 16 hours in a circulating air oven at 40–45° C.

B. The other half of the filtrate is treated with 0.12 part of ascorbic acid and 90 parts of water. The mixture is cooled to 0° C. and filtered. The precipitate is then washed with a solution of 0.05 part of ascorbic acid in 25 parts of 20% aqueous acetone and dried at 45–50° C.

The products of processes A and B show substantially the same properties as the corresponding products of Example 2.

*Example 4*

12 grams of 4-aminosalicylic acid from the same lot used in Examples 2 and 3 is dissolved in 130 parts of methanol at 45–50° C., 1.2 parts of activated carbon and 0.6 part of a filter aid are added, and the mixture is clarified at 45–50° C. The almost water-white filtrate is divided into two equal parts A and B.

A. One-half is diluted with 195 parts of water, cooled to 0° C. and filtered. The precipitate is washed with 25 parts of 20% aqueous methanol and then dried 16 hours in a circulating air oven at 40–45° C.

B. The other half of the solution is treated with 0.26 part of ascorbic acid and 195 parts of water. The mixture is cooled to 0° C. and filtered. The precipitate is washed with a solution of 0.05 part of ascorbic acid in 25 parts of 20% aqueous methanol and then dried as in A above. This material is much lighter in color than A above, and in fact is a pure white color which does not darken appreciably on exposure to air and indirect sunlight for 24 to 48 hours. In a closed brown glass bottle it is stable for many weeks.

I claim:

1. A 4-aminosalicylic acid product comprising substantially pure 4-aminosalicylic acid and ascorbic acid, the ascorbic acid content being at least approximately 0.03%.

2. A 4-aminosalicylic acid product comprising substantially pure 4-aminosalicylic acid and ascorbic acid, the ascorbic acid content being at least approximately 0.1%.

3. A process of preparing light-colored, stable 4-aminosalicylic acid which comprises subjecting 4-aminosalicylic acid to the action of a solution of ascorbic acid, and recovering the 4-aminosalicylic acid as a solid, the concentration of the ascorbic acid solution being sufficient so that the solid 4-aminosalicylic acid recovered has an ascorbic acid content of at least approximately 0.03%.

4. A process according to claim 3 in which the ascorbic acid is in aqueous solution.

5. A process according to claim 4 in which the 4-aminosalicylic acid is slurried for purification in water containing the ascorbic acid in solution.

6. A process according to claim 4 in which a cake of purified 4-aminosalicylic acid is washed with an aqueous solution of ascorbic acid.

7. A process according to claim 3 in which the concentration of ascorbic acid in solution is sufficient to produce an ascorbic acid content of at least 0.1%.

8. A process according to claim 4 in which the concentration of ascorbic acid in solution is sufficient to produce an ascorbic acid content of at least 0.1%.

9. A process according to claim 5 in which the concentration of ascorbic acid in solution is sufficient to produce an ascorbic acid content of at least 0.1%.

10. A process according to claim 6 in which the concentration of ascorbic acid in solution is sufficient to produce an ascorbic acid content of at least 0.1%.

MARTIN E. HULTQUIST.

REFERENCES CITED

The following references are of record in the file of this patent:

UNITED STATES PATENTS

| Number | Name | Date |
|---|---|---|
| 2,377,029 | Norris | May 29, 1945 |
| 2,377,031 | Norris | May 29, 1945 |
| 2,377,188 | Schwenk et al. | May 29, 1945 |

FOREIGN PATENTS

| Number | Country | Date |
|---|---|---|
| 12,191 | Great Britain | 1889 |
| 181,919 | Switzerland | Apr. 1, 1936 |